US012755586B2

(12) United States Patent
Wang

(10) Patent No.: US 12,755,586 B2
(45) Date of Patent: Oct. 6, 2026

(54) AUTOMATED VEHICLE ACTIONS, AND ASSOCIATED SYSTEMS AND METHODS

(71) Applicant: SHENZHEN ZHUOYU TECHNOLOGY CO., LTD., Shenzhen (CN)

(72) Inventor: Mingyu Wang, Shenzhen (CN)

(73) Assignee: SHENZHEN ZHUOYU TECHNOLOGY CO., LTD., Shenzhen (CN)

(*) Notice: Subject to any disclaimer, the term of this patent is extended or adjusted under 35 U.S.C. 154(b) by 981 days.

(21) Appl. No.: 16/952,977

(22) Filed: Nov. 19, 2020

(65) Prior Publication Data

US 2021/0074091 A1 Mar. 11, 2021

Related U.S. Application Data

(63) Continuation of application No. PCT/CN2018/112168, filed on Oct. 26, 2018.

(51) Int. Cl.

*G07C 5/08* (2006.01)
*G06V 20/56* (2022.01)

(Continued)

(52) U.S. Cl.

CPC ......... *G07C 5/0825* (2013.01); *G06V 20/588* (2022.01); *G07C 5/02* (2013.01);

(Continued)

(58) Field of Classification Search

CPC ..... B60Q 1/52; B60Q 9/008; B60W 2420/42; B60W 2520/10; B60W 2520/105;

(Continued)

(56) References Cited

U.S. PATENT DOCUMENTS

| | | | | |
|---|---|---|---|---|
| 5,900,821 | A * | 5/1999 | Petzold | B60S 1/0825 340/602 |
| 6,266,603 | B1 * | 7/2001 | Taffin | B60W 40/064 701/87 |

(Continued)

FOREIGN PATENT DOCUMENTS

| | | | |
|---|---|---|---|
| CN | 106114515 | A | 11/2016 |
| CN | 108422998 | A | 8/2018 |
| CN | 108583573 | A | 9/2018 |

OTHER PUBLICATIONS

International Search Report from Chinese Intellectual Property Office mailed Jul. 25, 2019 for International Application No. PCT/CN2018/112168 (3 pages).

*Primary Examiner* — Fadey S. Jabr
*Assistant Examiner* — Michael J Herrera

(57) ABSTRACT

Mappings of keys to actions can automate various vehicle systems. Some automations can provide lane departure warnings or emergency light reminders. Mapping keys can be matched based on vehicle condition data gathered from vehicle sensors. When a mapping key matches vehicle condition data, the vehicle action automation system can cause the vehicle to perform the one or more actions from that mapping. Mapping keys can be rules-based and/or model-based. Keys for lane departure mappings can specify vibration patterns expected when a vehicle drives over lane delineators. These vibration-based mappings can include keys with vibration patterns, e.g., defining vibration frequencies or vibration locations. Keys for emergency light mappings can be based on conditions such as (1) the vehicle being on the road, stopped, not in traffic, and not at a stop signal; (2) components of the vehicle having failed; or (3) weather conditions.

13 Claims, 7 Drawing Sheets

(51) Int. Cl.
*G07C 5/02* (2006.01)
*G08G 1/16* (2006.01)
*H04L 67/12* (2022.01)

(52) U.S. Cl.
CPC ........... *G07C 5/0808* (2013.01); *G08G 1/167* (2013.01); *H04L 67/12* (2013.01)

(58) Field of Classification Search
CPC ......... B60W 2530/10; B60W 2530/20; B60W 2552/53; B60W 2555/20; B60W 50/14; G06V 20/588; G07C 5/02; G07C 5/0808; G07C 5/0825; G08G 1/167; H04L 67/12
See application file for complete search history.

(56) References Cited

U.S. PATENT DOCUMENTS

| | | | | |
|---|---|---|---|---|
| 9,290,174 | B1 * | 3/2016 | Zagorski | B60W 30/18 |
| 10,000,152 | B1 * | 6/2018 | Scalea | B60Q 5/006 |
| 10,196,043 | B2 * | 2/2019 | Shoda | B60S 1/0833 |
| 11,260,850 | B2 * | 3/2022 | Weissenmayer | B60W 50/00 |
| 11,860,640 | B2 * | 1/2024 | Motoyama | G05D 1/0274 |
| 2005/0212666 | A1 * | 9/2005 | Kawazoe | G07C 5/085 340/436 |
| 2006/0212193 | A1 * | 9/2006 | Breed | B60C 23/0425 701/33.7 |
| 2008/0243337 | A1 * | 10/2008 | Tsuda | B60W 50/14 701/41 |
| 2009/0295559 | A1 * | 12/2009 | Howell | B60W 50/0205 340/459 |
| 2012/0033076 | A1 | 2/2012 | Nakamura et al. | |
| 2012/0303269 | A1 * | 11/2012 | Kim | G08G 1/0969 701/461 |
| 2013/0253767 | A1 * | 9/2013 | Lee | B60W 50/04 701/41 |
| 2013/0271276 | A1 * | 10/2013 | Okada | B60Q 1/00 340/441 |
| 2015/0217781 | A1 * | 8/2015 | Lee | B60W 50/10 701/1 |
| 2016/0071418 | A1 * | 3/2016 | Oshida | B60W 30/165 701/23 |
| 2016/0090100 | A1 * | 3/2016 | Oyama | B60T 7/22 701/23 |
| 2017/0151994 | A1 * | 6/2017 | Braunberger | G02B 27/01 |
| 2017/0313250 | A1 * | 11/2017 | Fischer | B60R 1/083 |
| 2017/0371337 | A1 * | 12/2017 | Ramasamy | G08G 1/056 |
| 2018/0012092 | A1 * | 1/2018 | Gleeson-May | G06V 10/95 |
| 2018/0043870 | A1 | 2/2018 | Nagae et al. | |
| 2018/0113055 | A1 * | 4/2018 | Kubota | B60G 17/018 |
| 2018/0157271 | A1 * | 6/2018 | Urano | B60Q 1/46 |
| 2018/0201182 | A1 * | 7/2018 | Zhu | B60Q 1/535 |
| 2018/0209202 | A1 * | 7/2018 | Lv | B60J 7/0573 |
| 2018/0319320 | A1 * | 11/2018 | Tatara | B60Q 1/507 |
| 2018/0348759 | A1 * | 12/2018 | Freeman | A61N 1/3904 |
| 2019/0027040 | A1 * | 1/2019 | Ogawa | G06V 10/809 |
| 2019/0054922 | A1 * | 2/2019 | Yalla | B60W 10/08 |
| 2019/0134954 | A1 * | 5/2019 | Bauerle | B32B 17/10541 |
| 2019/0168664 | A1 * | 6/2019 | Tatara | B60Q 5/006 |
| 2019/0176687 | A1 * | 6/2019 | Nagata | B60W 40/13 |
| 2019/0185008 | A1 * | 6/2019 | Kanbayashi | G01W 1/02 |
| 2019/0202297 | A1 * | 7/2019 | Konishi | B60L 7/18 |
| 2019/0217769 | A1 * | 7/2019 | Nekic | B60Q 1/302 |
| 2020/0012280 | A1 * | 1/2020 | Lin | G05D 1/0276 |
| 2020/0027351 | A1 * | 1/2020 | Gotoda | B60W 60/0016 |
| 2020/0143682 | A1 * | 5/2020 | Chow | G07B 15/02 |
| 2020/0148214 | A1 * | 5/2020 | Tamagaki | B60R 21/00 |
| 2020/0292735 | A1 * | 9/2020 | Hadi | G08G 1/09 |
| 2021/0206367 | A1 * | 7/2021 | Liu | G08G 1/0112 |

* cited by examiner

AUTOMATED VEHICLE ACTIONS, AND ASSOCIATED SYSTEMS AND METHODS

CROSS REFERENCE TO RELATED PATENT APPLICATION

The present application is a continuation of International Patent Application No. PCT/CN2018/112168, filed Oct. 26, 2018, which is incorporated herein by reference in its entirety.

TECHNICAL FIELD

The present disclosure is directed to automated actions in a vehicle, and more particularly to executing actions that match vehicle condition data.

BACKGROUND

Developments in driving assistance technology have included functions such as adaptive cruise, automatic parking, lane departure warning, lane keeping, and fatigue driving reminders. These driving assistance functions are designed to make driving safer and easier. Driving assistance functions can obtain vehicle condition data, such as from a vehicle sensor network including light imaging, detection, and ranging (LIDAR) and other sensors and can use this data to select a warning.

Lane Departure Warning Systems (LDWS), for example, provide drivers with early warnings when the system determines that the vehicle is deviating from normal driving. A LDWS can be composed of a heads-up display (HUD), a camera or other sensors, and a controller. When a LDWS is enabled, the sensors (generally a camera placed on the side of the vehicle body or the rear view mirror) and controller continuously collect data and identify driving lanes. The LDWS also obtains position data for the vehicle within the current driving lane. The controller can detect when the vehicle deviates from the driving lane. Depending on a determined current operating state of a vehicle driver and vehicle (e.g., whether a turn signal is engaged), the controller can send out an alarm signal or alert via the HUD. The whole process can be repeated continuously about every 500 milliseconds.

Prior to computerized driving assistance technology, another driving warning system implemented raised, often reflective, lane delineators on the lane line separating driving lanes or signifying the edge of a driving lane. A vehicle driving over the lane delineators would cause a vibration, reminding the vehicle driver to pay attention

BRIEF DESCRIPTION OF DRAWINGS

The techniques introduced here may be better understood by referring to the following Detailed Description in conjunction with the accompanying drawings, in which like reference numerals indicate identical or functionally similar elements.

DESCRIPTION OF EMBODIMENTS

Figure 1:
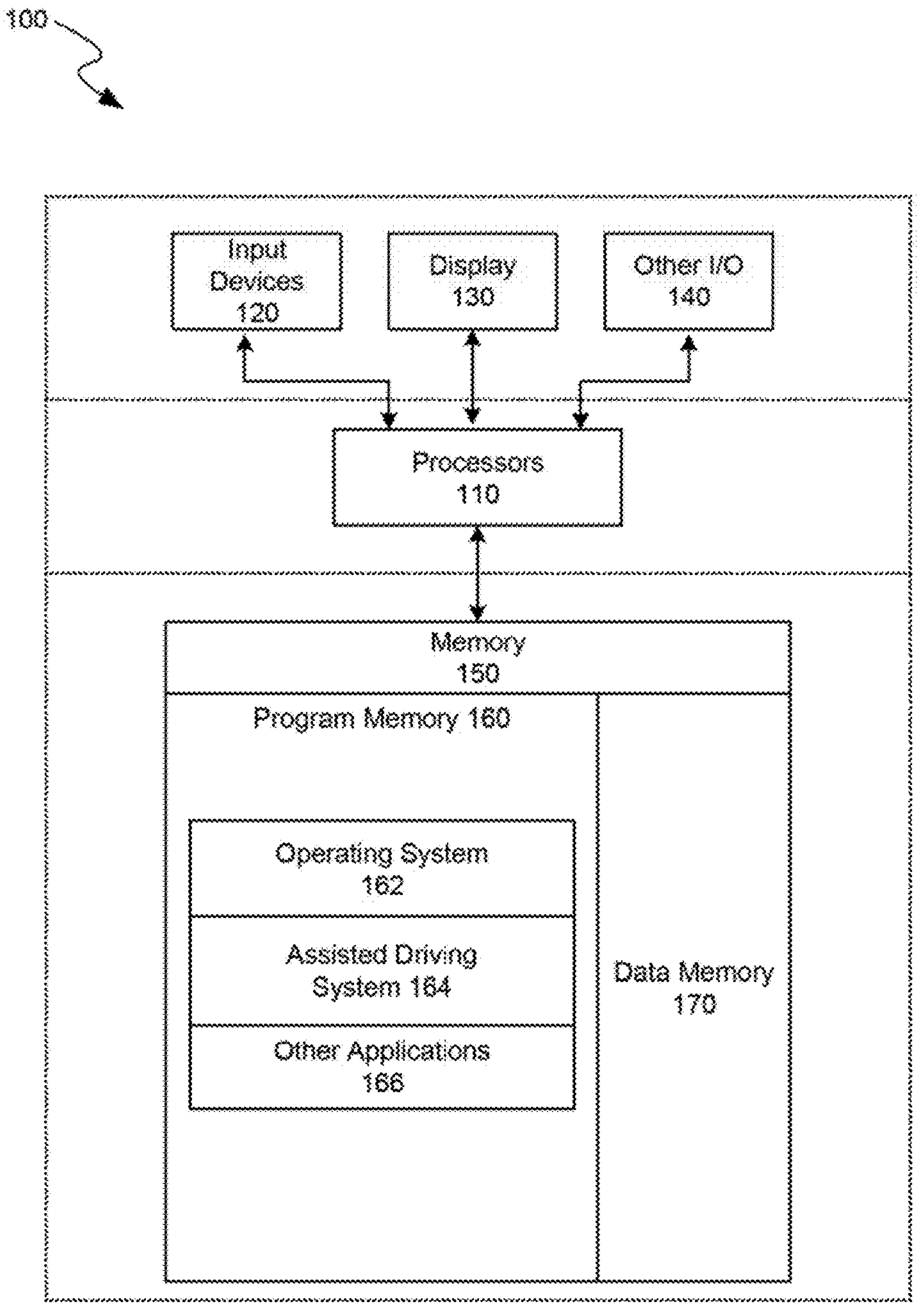
FIG. 1 is a block diagram illustrating an overview of devices on which some implementations can operate, in accordance with embodiments of the present technology.

Embodiments are provided herein for automating vehicle actions such as providing lane departure warnings and/or emergency light reminders based on vehicle condition data. Vehicle condition data can be gathered from one or more sensors of a vehicle (e.g., a "vehicle sensor network") or form external sources such as traffic data, weather data, roadway mappings, GPS signals, etc.

A vehicle action automation system can include mappings that map one or more keys to one or more vehicle actions. When a mapping key matches vehicle condition data, the vehicle action automation system can cause the vehicle to perform the one or more actions from that mapping. In some implementations, a mapping "key" can be a rules-based key that define one or more values or value ranges for a condition type, where that key is matched when a value from the vehicle condition data for the corresponding condition type is equal to the value or falls within the value range. In some cases, these keys can be defined as expressions of multiple conditions connected with operators. In some implementations, a mapping "key" can be a model-based key that includes one or more trained models that receives identified values from the vehicle condition data and produces an indication of whether the identified values match that key. In some implementations, a mapping key can be both a rules-based key and a model-based key, including both rules and one or more models. The one or more actions in a mapping can include, for example, activating a warning system, turning on emergency lights or other signal systems, signaling other vehicles, automatically controlling a component of the vehicle such as brakes, acceleration, or steering, etc. Additional information on mappings are disclosed below in relation to FIGS. 4 and 6A-6C.

In some implementations, the vehicle action automation system includes mappings for lane departure actions, such as activating a warning of the lane departure, causing the vehicle to slow down, or controlling steering of the vehicle to avoid the lane departure. In some implementations, keys for these lane departure mappings can be based on identifying vibration patterns in the vehicle caused by the vehicle driving over lane delineators. These vibration-based mappings can include keys with vibration patterns, e.g., defining vibration frequencies and/or vibration frequencies detected for certain vehicle locations, such as particular tires. The vibration patterns can correspond to vibration frequencies known to correspond to driving over lane delineators. In some implementations, these vibration patterns can be based on factors such as a configuration of the vehicle or current driving conditions. Additional information on identifying mappings for lane departure actions are disclosed below in relation to FIG. 5A.

In some implementations, the vehicle action automation system includes mappings for emergency light actions, such as reminding the vehicle driver to activate the vehicle's emergency lights or automatically enabling the vehicle's emergency lights. In various implementations, keys for these emergency light mappings can include vehicle conditions where: (1) the vehicle on the road, is below a specified speed, is not in traffic, and is not a stop signal; (2) one or more specified components of the vehicle have failed; or (3) the vehicle is in particular weather conditions. Additional information on identifying mappings for emergency light actions are disclosed below in relation to FIG. 5B.

While existing driving assistance functions can warn drivers of lane departures in some circumstances, these functions suffer from failures when a vehicle is deviating from a driving lane, but a lane departure warning is not triggered. The technical aspects disclosed herein can improve the functioning of driving assistance functions by making lane departure warnings more reliable. In particular, using mappings with keys, as either machine learning models or condition values, that use vibration patterns for lane departure warning actions, either alone or in combination with vision based LDWS indicators, can increase warning accuracy and driving safety.

Existing driving assistance functions also fail to provide emergency light actions, such as suggesting when to activate emergency lights or automatically enabling them. The technical aspects disclosed herein further improve the functioning of driving assistance functions by providing these emergency light actions. In particular, using mappings for emergency light actions where the mappings have trained models or condition value keys that use factors such as speed, roadway condition, weather conditions, traffic, etc., further increases warning accuracy and driving safety.

Several implementations are discussed below in more detail with reference to the figures. FIG. 1 is a block diagram illustrating an overview of devices on which some implementations of the disclosed technology can operate. The devices can comprise hardware components of a device 100 that use mappings of keys (as either condition values or trained models) to automate vehicle actions, to implement new (and improve existing) assisted driving functions. Device 100 can include one or more input devices 120 that provide input to the processor(s) 110 (e.g., CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

The processors 110 can include a single processing unit or multiple processing units in a device or distributed across multiple devices. The processors 110 can be coupled to other hardware devices, for example, with the use of a bus, such as a PCI bus or SCSI bus. The processors 110 can communicate with a hardware controller for devices, such as for a display 130. The display 130 can be used to display text and graphics. In some implementations, the display 130 provides graphical and textual visual feedback to a user. In some implementations, the display 130 includes the input device as part of the display, such as when the input device is a touchscreen or is equipped with an eye direction monitoring system. In some implementations, the display is separate from the input device. Examples of suitable display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or in a wire-based manner with a network node. The communication device can communicate with another device or a server through a network using, for example, TCP/IP protocols. The device 100 can utilize the communication device to distribute operations across multiple network devices.

The processors 110 can have access to a memory 150 in a device or distributed across multiple devices. The memory includes one or more of various hardware devices for volatile and non-volatile storage, and can include both read-only and writable memory. For example, the memory can comprise random access memory (RAM), various caches, CPU registers, read-only memory (ROM), and writable non-volatile memory, such as flash memory, hard drives, floppy disks, CDs, DVDs, magnetic storage devices, tape drives, device buffers, and so forth. The memory is not a propagating signal divorced from underlying hardware; a memory is thus non-transitory. The memory 150 can include program memory 160 that stores programs and software, such as an operating system 162, assisted driving system 164, and other application programs 166. The memory 150 can also include data memory 170 that can store, e.g., vehicle condition data, identified conditions, automation mappings, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, tablet devices, multiprocessor systems, microprocessor-based systems, programmable consumer electronics, network PCs, minicomputers, mainframe computers, distributed computing environments that include any of the above systems or devices, or the like.

Figure 2:
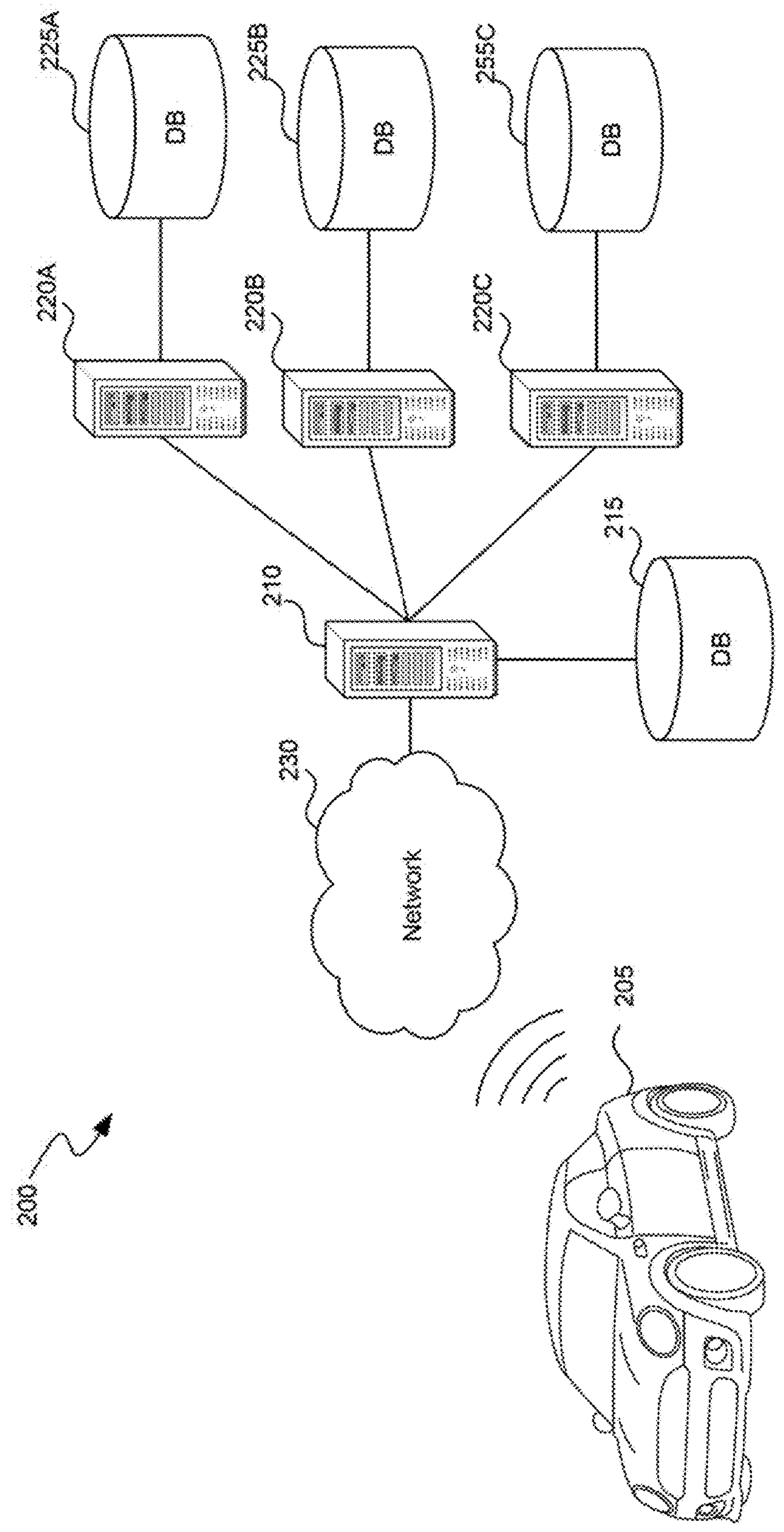
FIG. 2 is a block diagram illustrating an overview of an environment in which some implementations can operate, in accordance with embodiments of the present technology.

FIG. 2 is a block diagram illustrating an overview of an environment 200 in which some implementations of the disclosed technology can operate. The environment 200 can include one or more vehicles that comprise a computing device 205, examples of which can include the device 100 described above. Vehicles with a computing device 205 can operate in a networked environment using logical connections through network 230 to one or more remote computers, such as a server computing device.

In some implementations, a server 210 can be an edge server which receives client requests and coordinates fulfillment of those requests through other servers 220, e.g., threes servers shown as servers 220A-C. Server computing devices 210 and 220 can comprise computing systems, such as the device 100 described above. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g., store) information. Though databases 215 and 225 are displayed logically as single units, databases 215 and 225 can each be (or can include) a distributed computing environment encompassing multiple computing devices, can be located within their corresponding server, or can be located at the same or at geographically disparate physical locations.

Network 230 can be a local area network (LAN) or a wide area network (WAN) or can be other wired or wireless networks. Network 230 may be the Internet or some other public or private network. A vehicle with a computing device 205 can be connected to network 230 through a network interface, such as a wireless communication connection (e.g., a cellular network or satellite connection). While the connections between server 210 and servers 220 are shown as separate connections, these connections can be any suitable kind of local, wide area, wired, or wireless network, including network 230 or a separate public or private network.

Figure 3:
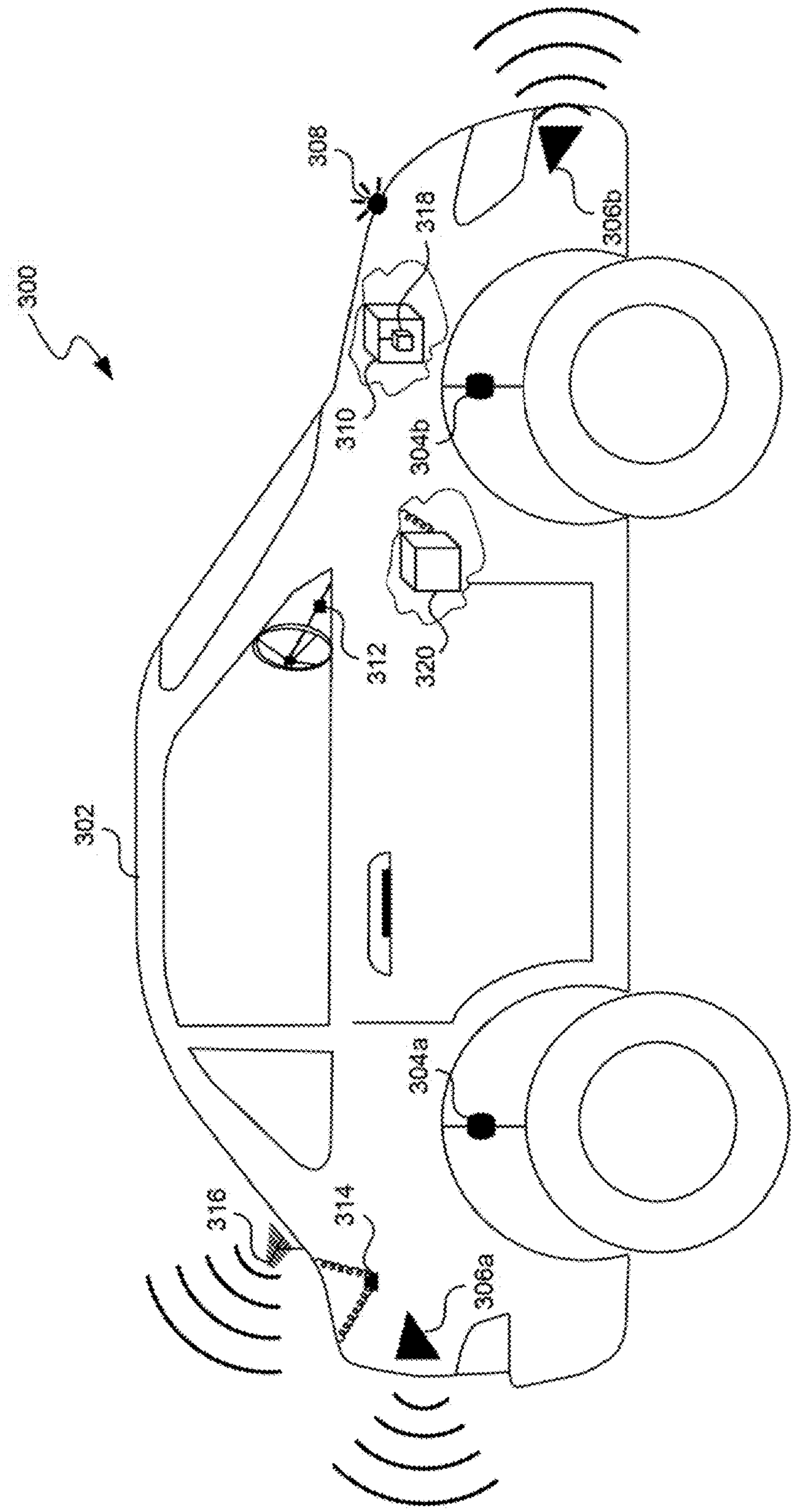
FIG. 3 is a schematic illustration of a partially representative vehicle with a sensor network and processing system, configured in accordance with embodiments of the present technology.

FIG. 3 is a partial schematic diagram illustrating an example 300 of a vehicle 302 with a sensor network 304-318 and/or a processing system 320. In some implementations, vehicle 302 can be a vehicle with a computing device 205. In example 300, the sensor network of vehicle 302 includes vibration sensors 304, with one sensor on the suspension or otherwise measuring the vibrations at each vehicle tire. This arrangement allows the system to determine a vibration pattern that includes either or both vibration frequencies or locations. The sensor network of vehicle 302" may also include LIDAR sensors for various areas around the vehicle, such as rear sensor 306*a* and front sensor 306*b*; cameras, such as camera 308; engine and other component sensors 310 that monitor the functional state of the associated components; steering wheel position sensor 312; weather sensor 314; an antenna 316 providing wireless communication with external computing systems; and a speed/acceleration sensor 318. Sensors 304-318 are not exhaustive of the type, placement, or functionality of sensors in the vehicle sensor networks used in various implementations.

Figure 4:
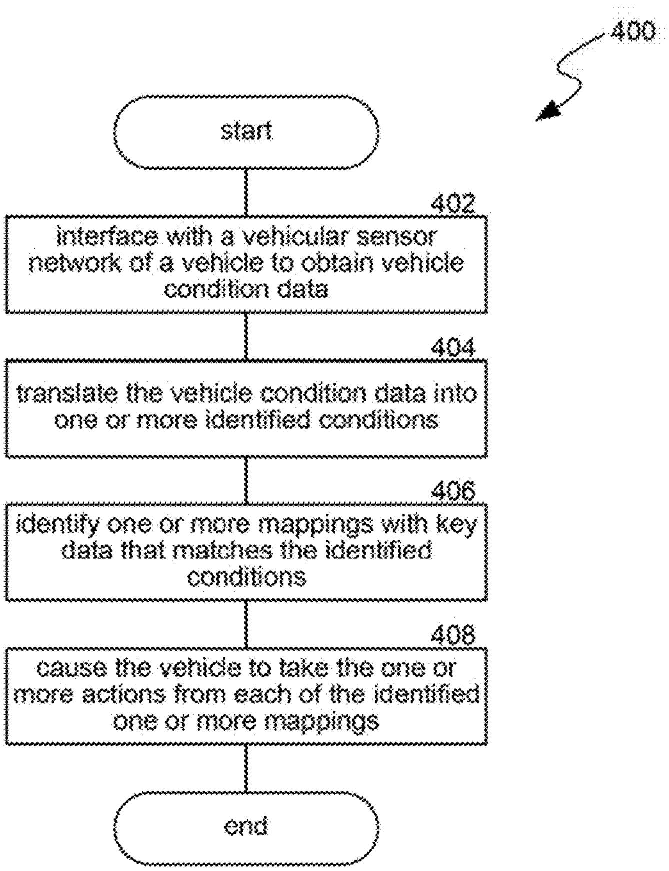
FIG. 4 is a flow diagram illustrating a process used in some implementations for automating vehicle actions from mappings with keys that match vehicle condition data, in accordance with embodiments of the present technology.

FIG. 4 is a flow diagram illustrating a process 400 used in some implementations for automating vehicle actions from mappings with keys that match vehicle condition data. In some implementations, process 400 can be performed by a computing system of a vehicle with a sensor network, such as vehicle 205 or 302, described above.

At block 402, the process 400 executed by the vehicle computing system can interface with the vehicle sensor network to obtain vehicle condition data. A vehicle sensor network can include any suitable type of data gathering device such as vibration sensors, cameras, laser emitters and reflection detectors, weather sensors, speed sensors, acceleration sensors, component functionality sensors, steering wheel position or tire direction sensors, sensors indicating engagement status of other vehicle systems (e.g., signal lights, windshield wipers, brakes, sound system, environmental controls, navigation system, etc.), transceivers for network connections, etc. Vehicle condition data from the vehicle sensor network can include vibration readings, images or video, laser reflection readings, weather data (e.g., moisture readings, temperature, etc.), speed or acceleration data, indications of whether components are able to function, indications of a level at which components are functioning, angles of tires or of a steering wheel, status of other vehicle systems, data accessed through a network, etc. In some implementations, part of the vehicle condition data can be from a log of previously recorded data from the vehicle sensor network.

At block 404, process 400 can translate the vehicle condition data into one or more identified conditions. In various implementations, translating the vehicle condition data into one or more identified conditions can include one or more of: comparing values from the vehicle condition data to threshold, extracting values from the vehicle condition data, performing various analyses on the vehicle condition data, identifying conditions from network data or other external source data in the vehicle condition data, etc. The process of translating using thresholds can include comparing certain parts of vehicle condition data to corresponding thresholds, where the condition is identified when the threshold is met. As examples, a "raining" condition can be set when a moisture reading is above a corresponding threshold and/or a "nighttime" condition can be set when a brightness reading is below a corresponding threshold. The process of translating by extracting values can include recording a value from the vehicle condition data, such as a current speed, an angle of a steering wheel position, or whether a vehicle component is functioning properly.

The process of translating that includes analyzing aspects of the vehicle condition data can implement any of a number of suitable algorithms. For example, using environment condition data such as images (camera, infrared, or other light-based data), LIDAR readings, motion data, etc., the process 400 can perform object recognition to identify one or more objects, which can be associated with a trajectory and/or location, and/or can be automatically mapped into a virtual environment. In some implementations, instead of identifying particular objects, the process 400 can just identify that an object is at a particular location. Object recognition, for example, can be identifying people, other vehicles, lane edges, lane delineator types, stop signals, weather conditions, etc. Object recognition can also include determining where these objects are in relation to the vehicle, and their predicted movement (e.g., whether they are stopped, which direction they are moving in, what speed they are moving at, etc.). In some implementations, object recognition and subsequent processing can be used to determine current traffic conditions, whether the vehicle is on a roadway, whether the vehicle is at a stop signal, etc.

Lane delineators can have different "types," such as individual lane delineator shape, size, material, and/or spacing between lane delineators. In various implementations, lane delineators can be plastic nodules added to a roadway, depressions made in the pavement of a roadway, and/or other additions or modifications to roadway. The lane delineator type can partly determine the vibration frequency that will result from driving over the lane delineators. In some implementations, object recognition can determine a type of lane delineator by identifying, in images, the type, spacing, and/or shape of lane delineators such as raised domes, flexible tabs, rectangular prisms, pavement depressions, and/or other types. In some implementations, lane delineators have a reflective surfaces and the process 400 can determine the lane delineator type based on the reflectiveness or reflective pattern of one or more lane delineators. In some implementations, the process 400 can have access to a set of known lane delimitating configuration (e.g. lane delimitators) types, and can select the type that best matches the determined lane delimitating features (e.g., size, shape, spacing).

In some implementations, translating the vehicle condition data into identified conditions can include identifying a vibration pattern the vehicle is currently experiencing, which can include identifying a vibration frequency and/or locations of the vehicle that are experiencing the vibrations. Additional details for determining a vibration pattern are described below in relation to blocks 502 and 504.

In some implementations, translating the vehicle condition data into identified conditions can include identifying conditions from network data or data from another external source. For example, this externally sourced data can be received by the vehicle antenna, e.g., via cell network or satellite signal. Process 400 can determine conditions from this data such as a map of the area around the vehicle (which may also identify roadways, stop signal location, pre-determined lane delineator types for particular roadways, etc.), GPS readings, weather data in the vicinity of the vehicle, traffic data for a roadway the vehicle is on, etc.

At block 406, the process 400 can identify one or more mappings with key data that matches the conditions identified at block 406. As discussed above, a "mapping" maps (A) a key for one or more conditions to (B) at least one action. A match can occur based on an evaluation of the mapping key in relation to one or more of the conditions determined at block 406. Additional details on various mapping configurations are provided below in relation to FIGS. 6A-6C.

In some cases, a mapping key can specify, for one or more condition types, a value or value range. The key is matched when the conditions of the specified type match the values or value ranges. The key can be an expression of such values or value ranges, connected by operators such as equivalents of: "AND" "OR"<" ">"NOT" "+" "/", etc. For example, a key can be "NOT(nighttime) AND (speed-10 kph)/2>15 kph AND IN (deceleration, 1.2 m/s {circumflex over ( )}2-2.2 m/s {circumflex over ( )}2)" meaning the key is matched when the conditions indicate (1) it is not nighttime, (2) the current speed of the vehicle, minus ten kilometers per hour then divided by two is greater than 15 kilometers per hour, and (3) the vehicle is decelerating in the range of 1.2-2.2 meters per second squared.

In some implementations, a mapping key includes a trained model that receives identified conditions or other values from the vehicle condition data and produces an indication of whether the key is matched, i.e. whether the identified values match the key. A "trained model" or "model," as used herein, refers to a construct that is trained using training data to make predictions or provide probabilities for new data items, whether or not the new data items were included in the training data. For example, training data can include items with various parameters and an assigned classification. A new data item can have parameters that a model can use to assign a classification to the new data item. As another example, a model can be a probability distribution resulting from the analysis of training data, such as a likelihood of traffic slowing down given a current traffic pattern, based on an analysis of a large number of previously identified traffic patterns and deceleration data. Examples of suitable models include: neural networks, support vector machines, decision trees, decision tree forests, Parzen windows, Bayes, clustering, reinforcement learning, probability distributions, and others. Models can be configured for various situations, data types, sources, and output formats.

In some implementations, a trained model can be a neural network with multiple input nodes that receive vehicle condition data or identified conditions, e.g., as individual values, as a sparse vector, as a histogram version of an image, etc. The input nodes can correspond to functions that each receive the input and produce results. These results can be provided to one or more levels of intermediate nodes that each produce further results based on a combination of lower level node results. A weighting factor can be applied to the output of each node before the result is passed to the next layer node. At a final layer, ("the output layer,") one or more nodes can produce a value classifying the input that, once the model is trained, can be used as a determination of whether the key has been matched. For example, the output can be a value between 0-1, with the closeness to either end of this spectrum indicating a confidence factor for the match determination.

A neural network can be trained with supervised learning, where the training data includes vehicle condition data, or identified conditions when a human was driving, as input, and the corresponding human actions taken as the output. During training, as these training items are applied to the model, output from the model can be compared to the desired output (i.e. a match is the correct output where the action the key is matched to was taken by the human). Based on the comparison, the neural network can be modified, such as by changing weights between nodes of the neural network or parameters of the functions used at each node in the neural network such that model output provides a better output for the key's "match" or "non-match" result. While the above describes one configuration of a neural network, others can be used in addition to or in lieu of the specific configuration described above.

In some implementations, after a model is initially trained and deployed, the training of the mode can be updated using additional observed correspondences between vehicle condition data and human actions while driving. In some implementations, additional model training items can be created using (1) a human initiation of an action that the trained model is mapped to and (2) values for at least one condition of the vehicle in relation to when the human initiated action occurred. The model training can be updated by applying each of the additional model training items by supplying the values for the at least one condition to the trained model and updating one or more parameters of the trained model based on a comparison of output of the mode to the human initiated action.

One potential mapping that can be identified at block 406 is a mapping of (A) a key for a particular vibration pattern, including a particular vibration frequency and/or one or more particular vibration locations, to (B) a lane departure warning action. This type of mapping is discussed in greater detail below in relation to FIG. 5A. A second potential mapping that can be identified at block 406 is a mapping of (A) a key for the vehicle being on the road, being below the specified speed, not being in traffic, and not being at a stop signal to (B) an action for emergency lights, such as automatically enabling them or providing a notification to a driver to enable them. This type of mapping is discussed in greater detail below in relation to FIG. 5B. A third potential mapping that can be identified at block 406 is a mapping of (A) a key for the vehicle being in particular weather conditions to (B) an action for emergency lights. A fourth potential mapping that can be identified at block 406 is a mapping of (A) a key for a failure condition in one or more specified components of the vehicle to (B) an action for emergency lights.

At block 408, the process 400 can cause the vehicle to take one or more actions that are specified in the mappings identified at block 406. In various implementations, actions can include automatically enabling, disabling, or controlling a vehicle system such as emergency lights, headlights, fog lights, brakes, anti-lock braking systems, steering, windshield wipers, sound system controls, seat position configurations, mirror position configurations, automated driving modes (e.g., sport mode, eco mode, poor weather mode, etc.). In some implementations, actions can include providing a notification such as one or more of a voice notification, an alarm, a visual notification, or any combination thereof. In some implementations, the action can be modified based in the key match. For example, the key can specify multiple ways to be matched or levels of match and a parameter for controlling the corresponding one or more actions depending on which way or level the key is matched. As a more specific example, a key can specify an object identification for an emergency vehicle (e.g., based on image data and/or siren sounds) and can also specify a distance range condition. When the key is matched (e.g., an emergency vehicle is identified at a distance within the specified range) the mapping can specify two actions: first, automatically decrease the volume of a sound system in the vehicle by an amount that is based on where in the range the distance to the emergency vehicle falls; and second, play an alert sound. The alert signifies to the driver that an emergency vehicle is near that the driver should look for while automatically decreasing the sound system volume proportionately to the determined emergency vehicle distance allows the driver to more easily identify the vehicle location as it approaches.

In some implementations, when a match is found for a key involving a vibration pattern mapped to a lane departure warning action, and when the vehicle includes another lane deviation warning system (LDWS), causing the vehicle to take the one or more actions can be based on a combination of (a) the match between the one or more identified conditions and the first key for a particular vibration pattern and (b) a lane deviation determination by the LDWS. In some implementations, the combination is performed in part by weighting (i) either or both of a value produced for the LDWS lane deviation detection and a value produced for the match between the one or more identified conditions and the first key by (ii) either or both of a reliability factor and a confidence score. For example, the mapping key, using a trained model, can indicate a lane deviation and the trained model output can signify a confidence score of 55%. In addition, the LDWS can indicate a lane deviation with a confidence score of 85%. These scores can be used as weighting factors to determine an overall result of lane deviation with a (55%+85%)/2=70% score. A lane deviation can be issued when the score is greater than 50%, so the warning action is taken. However, in this example, the mapping system has a reliability factor of 90% while the LDWS has a reliability factor of only 40%, these values can be used as further weighting factors. Thus, the mapping can indicate a lane deviation, with a (55%*90%)=49.5% score and the LDWS can indicate no lane deviation with a (85%*40%)=34% score. The combination is then a lane deviation result with a (49.5%+34%)/2=41.75% score. Now the score is less than 50%, so the warning action is not taken.

Figure 5A:
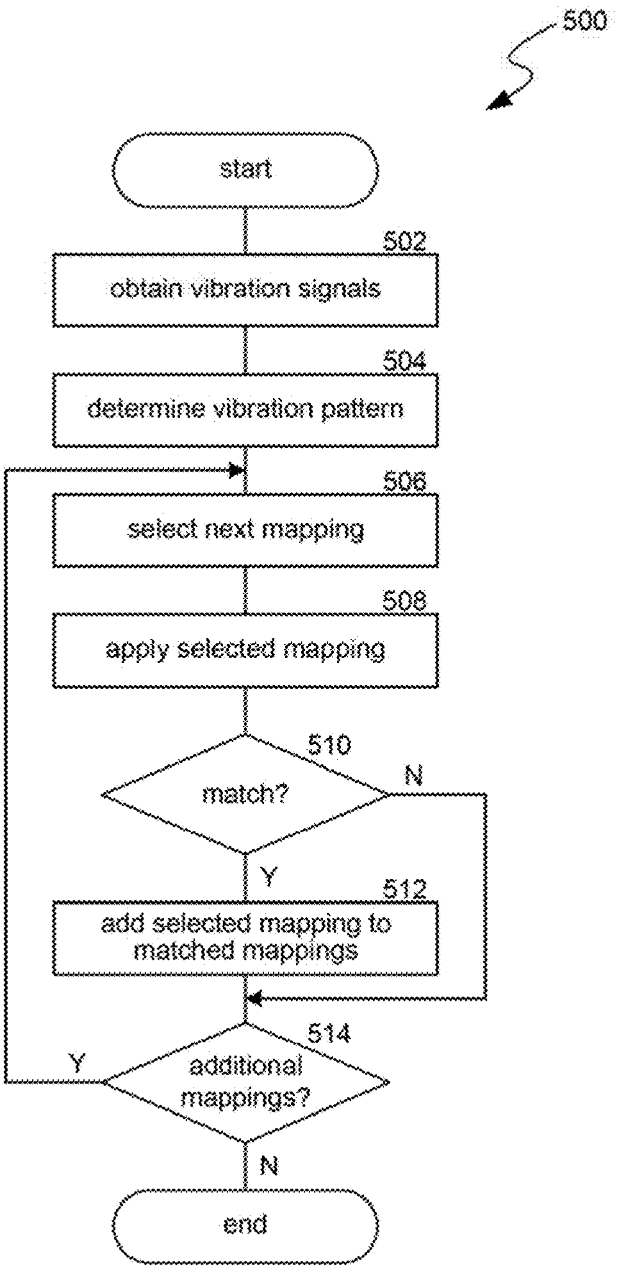
FIG. 5A is a flow diagram illustrating a process used in some implementations for translating vehicle condition data and identifying vibration-based lane departure mappings, in accordance with embodiments of the present technology.

FIG. 5A is a flow diagram illustrating a process 500 used in some implementations for translating vehicle condition data and identifying vibration-based lane departure mappings. In some implementations, process 500 is performed as a sub-process of process 400, implementing blocks 404 and 406.

At block 502, the process 500 can obtain one or more vibration signals from vehicle condition data of a vehicle. In some implementations, this can be the vehicle condition data obtained at block 402. Vibration signals can be obtained from one or more vibration sensors of the vehicle. In some implementations, a vibration signal can be received from a vibration corresponding to each tire of the vehicle. Vibration frequencies can be determined from the vibration signal. In some implementations, the vibration frequencies can be adjusted for specifics of the vehicle or of the environment the vehicle is traveling through. For example, adjustment factors can include one or more of: specifics of a suspension used in the vehicle, an amount of wear on the suspension, a weight of the vehicle, identified road conditions, a current speed of the vehicle, and/or an acceleration of the vehicle. In some implementations, one or more of these adjustment factors can have one or more pre-determined effects on a received vibration signal, which can be negated to normalize the signal, canceling out differences in vibration frequencies due to these factors. Process 500 can also include preforming additional adjustments, such as amplifications, applying filters, and/or removing the noise floor. For example, the process 500 can include filtering out vibrations expected for particular types of terrain, such as gravel, or for particular weather conditions, such as rain.

At block 504, the process 500 can determine a vibration pattern based on the vibration signals, as modified in block 502. The vibration pattern can include at least one vibration frequency, and in some implementations, a location for the vibration frequency or frequencies. The vibration location(s) can be determined based on location(s) of the sensors that measured the vibrations, e.g., which tire(s), which shock(s), etc. to which the sensors are attached. Where the vehicle has four wheels, the vibration location for a vibration frequency can be determined as one or more of: front-right, front-left, back-right, back-left, left, right, front, back, or all, depending on which tire, pair of tires, or all four tires are experiencing the vibration at that frequency. For example, a location for a measured vibration within a particular vibration frequency range can be determined as only the vehicle's left side if only one or both measurements of vibrations for the tires on the vehicle's left side are identified as being in the vibration frequency range. As another example, process 500 can make separate determinations for front-left vibration, back-left vibration, or left side vibration (if both measurements of vibrations for the tires in on the vehicle's left side are identified as being in the vibration frequency range). Similar determinations can be made for the right side of the vehicle.

At block 506, the process 500 can select a next mapping with a key relating to vibrations from a set of available mappings. At block 508, process 500 can apply the selected mapping to determine if the key matches the identified conditions of the vehicle, including the vibration pattern determined at block 504. As discussed above, this can include determining if values from the vehicle condition data match values of the mapping's key or using the values with a trained model. Aspects of the vibration pattern can be used to determine these matches or as input to the trained model.

In some implementations, when a vehicle has four tires, with two tires on the vehicle's left side and two tires on the vehicle's right side, a mapping key can specify that there is a match when the vibration location from the vibration pattern is determined to be only on the vehicle's left side or only on the vehicle's right side.

In some implementations, a mapping can be based on different vibration locations depending on whether or not the vehicle is traveling generally straight. Traveling "generally straight" can be a circumstance indicated by a steering wheel position being within a threshold amount of a center position, e.g., +/− ten degrees. The key for this mapping can be matched by judging a first circumstance where the vehicle is slightly veering into a different lane while traveling generally straight by determining that both tires on one side of the vehicle are experiencing vibrations indicative of driving over lane delineators. This mapping can further be matched in a second circumstance where the vehicle is turning into a different lane (i.e. not traveling generally straight) by determining that only the front tire on one side of the vehicle is experiencing vibrations indicative of driving over lane delineators. More specifically, this key can be matched, when the steering wheel direction indicates the vehicle is traveling generally straight, if the vibration location is determined as only the vehicle's left side as indicated by both measurements of vibrations for the tires in on the vehicle's left side being in a specified vibration frequency range. In addition, this key can be matched, when the steering wheel direction indicates the vehicle is not traveling generally straight, if the vibration location is determined as only the vehicle's left side as indicated by just the front-left tire vibration measurement being in the specified vibration frequency range. Similar determinations can be made for the vehicle's right side.

In some implementations where a mapping key includes a condition relating to a vibration frequency, the vibration frequency can be based on one or more vibration frequencies observed to correspond to a vehicle driving over lane delineators. For example, vibration measurements can be taken from many iterations of different vehicle configurations driving over lane delineators. These vibration frequencies can be analyzed, e.g., using regression analysis, to eliminate the effect of differences between the vehicles or can be categorized such that vehicle characteristics can be determined to cause specific changes to vibration frequencies when driving over lane delimitators. In some implementations, the vibration frequencies can also be determined separately for different types of lane delimitators.

At block 510, if the key of the mapping applied at block 508 matches the identified conditions of the vehicle, the process 500 continues to block 512. If not the process 500 can continue to block 514. At block 512, the selected mapping can be added to a set of matched mappings. The vehicle can be caused to perform the actions for the mappings in the set of matched mappings, e.g., by process 400 at block 408. At block 514, process 500 can determine whether there are any more mappings in the set of mappings that use vibration patterns. If so, the process 500 returns to block 506 to select the next mapping and determine whether it matches the vehicle conditions. If not, the process 500 ends, e.g., continuing to block 408.

Figure 5B:
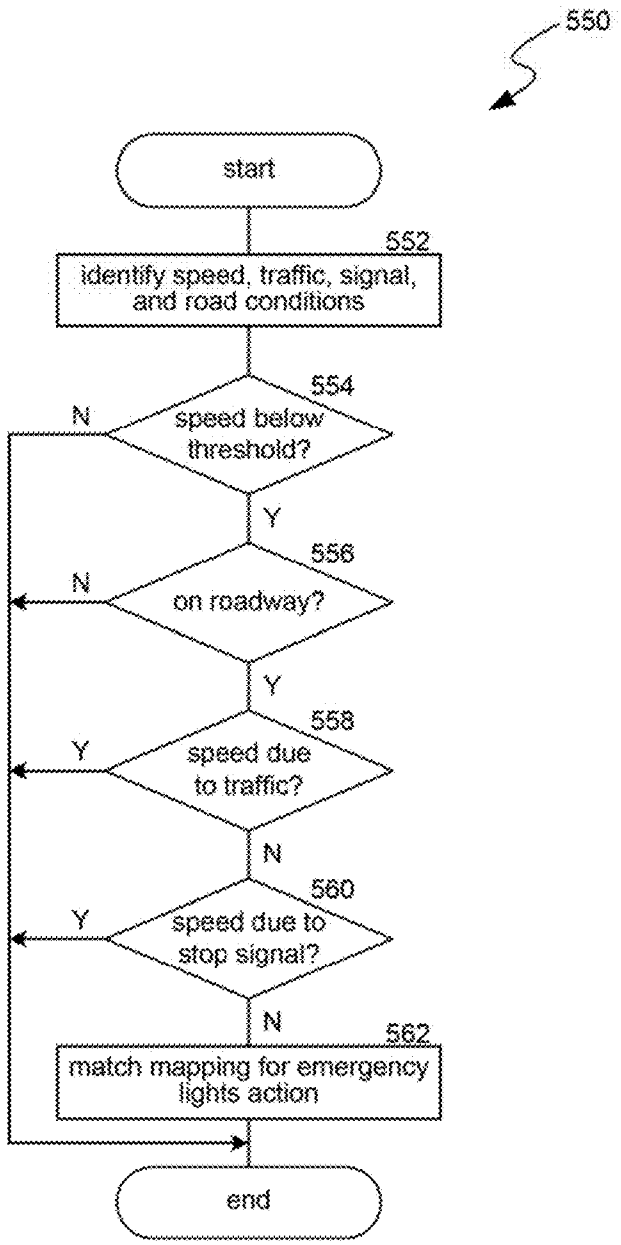
FIG. 5B is a flow diagram illustrating a process used in some implementations for translating vehicle condition data and identifying emergency light mappings, in accordance with embodiments of the present technology.

FIG. 5B is a flow diagram illustrating a process 550 used in some implementations for translating vehicle condition data and identifying emergency light mappings. In some implementations, process 550 is performed as a sub-process of process 400, implementing blocks 404 and 406.

At block 552, process 550 can identify vehicle conditions, from vehicle condition data, including a vehicle speed, whether the vehicle is in traffic, whether the vehicle is at a stop signal, whether the vehicle is on a roadway, among others. These conditions can be determined as discussed above in relation to blocks 402 and 404. One or more of these conditions can be determined in different manners in different implementations. For example, traffic conditions can be determined based on object analysis, recognizing the density and speed of other vehicles around the vehicle or can be determined based on a location of the vehicle and traffic data obtained for the vehicle location from a source external to the vehicle (e.g., network traffic data). Similarly, vehicle speed can be determined from sensors on vehicle components that measure vehicle speed, or from differences in determined locations (e.g., based on GPS data) divided by a time between the determined vehicle locations. As another example, whether or not the vehicle is on a roadway can be determined by imaging and object recognition or based on a determined vehicle location as compared to a roadway map. As a final example, whether the vehicle is at a stop signal can be determined based on imaging and object recognition or based on a determined vehicle location as compared to a map that includes identifications of stop signals.

Blocks 554-560 correspond to the conditions in a mapping key for an emergency lights action. The key is matched when the vehicle speed is below a threshold (e.g., is stopped, has slowed below 15 kph, or other suitable threshold) (as shown in block 554), the vehicle is on a roadway (as shown in block 556), the vehicle's speed is not due to it currently being in traffic (as shown in block 558), and the vehicle's speed is not due to it currently being at a stop signal (as shown in block 560). When the speed threshold is "stopped" (i.e. 0), blocks 554-556 can be specified as an expression in the mapping key as: "speed(0) AND roadway(true) AND NOT(inTraffic) AND NOT(atTrafficSignal)."

If the vehicle conditions match the mapping key, process 550 can continue to block 562, which signals that the mapping is a match, causing the vehicle to take the mapped one or more emergency light actions, such as automatically enabling the emergency lights or notifying a driver to enable them (e.g., at block 408).

In some implementations, the mapping key can include one or more additional elements before determining a match at block 562. For example, in some implementations, further conditions can include that there are one or more other vehicles within a threshold distance of the vehicle and/or that there is a change lane within a threshold distance of the vehicle.

Figure 6A:
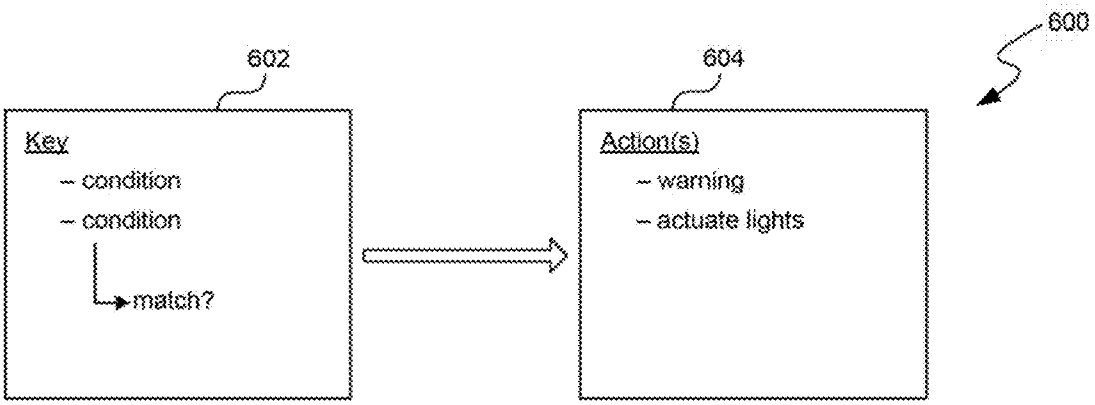
FIGS. 6A-6C are schematic diagrams illustrating various example key-to-action mappings used in some implementations, in accordance with embodiments of the present technology.
Figure 6B:
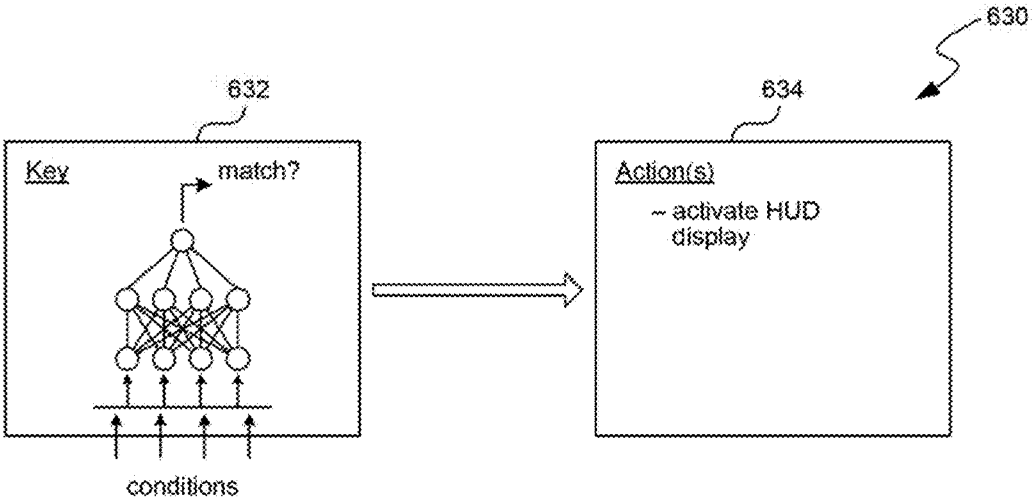
Figure 6C:
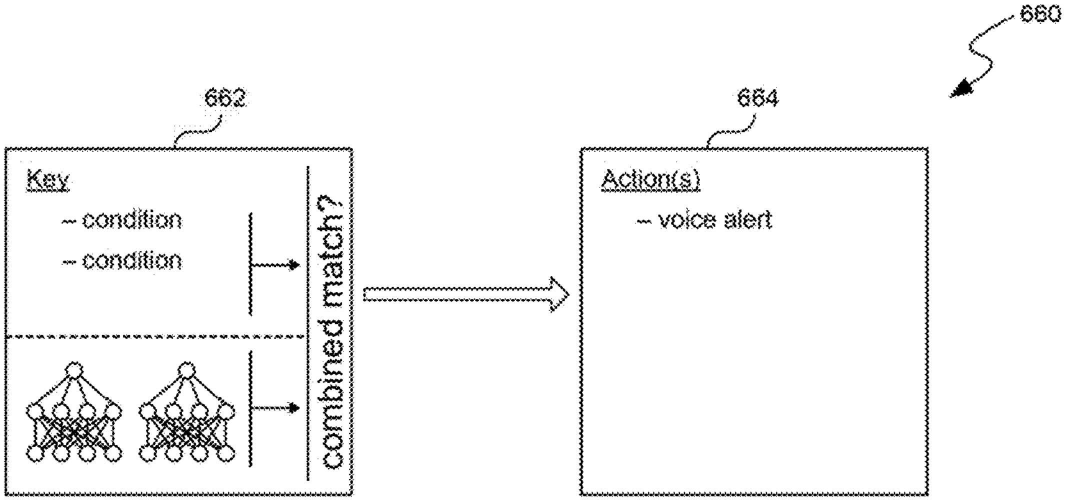

FIGS. 6A-6C are schematic diagrams illustrating various representative keys to action mappings 600, 630, and 660, used in some implementations.

Example 600 illustrates a mapping with key 602 and actions 604. Key 602 defines explicit conditions that get a value from identified vehicle conditions. These conditions can be arranged as an expression, e.g., using operators. When the expression evaluates to true, the key is matched, causing the actions in actions 604 to be performed.

Example 630 illustrates a mapping with key 632 and 634. Key 632 uses a trained neural network model that receives identified vehicle actions conditions as input and provide an output specifying whether the conditions match the key. In some implementations, key 632 can include multiple trained models (not shown), whose output can be combined to determine a match. Model outputs can be combined using weighting factors, such as a confidence level produced by the model and/or weights for predetermined reliabilities of the individual models. The model or combined models' output signifying a match causes the actions in actions 634 to be performed.

Example 660 illustrates a mapping with key 662 and actions 664. Key 662 is a hybrid key that includes both conditions and one or more trained models. The conditions portion can determine a match similarly to example 600 and the one or more trained models portion can determine a match similarly to example 630. The key in example 662 can then determine a combined match from the determinations of each portion. This combination can apply weighting factors, such as predetermined reliabilities for each portion. The weighting factors can also be confidence factors for each portion. A confidence factor for the trained models portion can be based on how closely the output from the models corresponds to a match or non-match determination. For example, each model can produce a score from 0-1 with a score less than 0.5 indicating a non-match and a score 0.5 or above indicating a match, where closer to 0 produces a higher "non-match" confidence factor and closer to 1 produces a higher "match" confidence factor. While the conditions portion can be a binary result, a confidence factor for this portion can be based on confidences determined for the underlying identified conditions. For example, conditions based on object identification can have a confidence score from the system specifying how confident the system is that particular objects have been correctly identified. If the combined match signifies a match to key 662, this causes the actions in actions 664 to be performed.

Those skilled in the art will appreciate that the components and step or process elements illustrated in the Figures described above may be altered in a variety of ways without deviating from the present technology. For example, the order of the logic may be rearranged, substeps may be performed in parallel, illustrated logic may be omitted, other logic may be included, etc. In some implementations, one or more of the described components can execute one or more of the described steps.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

I claim:

1. A method for automating vehicle actions, executed by a vehicle computing system, comprising:

interfacing with a vehicle sensor network of a vehicle to obtain vehicle condition data;

translating the vehicle condition data into identified conditions, wherein the translating comprises:

identifying a vehicle condition using the vehicle sensor network, wherein the vehicle condition comprises: the vehicle being on the road, being below the specified speed, not being in traffic, and not being at a stop signal, wherein not being in traffic and not being at a stop signal are identified based on a determined location of the vehicle and traffic data obtained for the determined location from a network source external to the vehicle;

identifying weather conditions for an environment of the vehicle;

identifying a component functioning state for components of the vehicle; and extracting values from the vehicle condition data, performing various analyses on the vehicle condition data, and identifying conditions from network data or other external source data in the vehicle condition data;

causing the vehicle to take actions specified by mappings, wherein each particular mapping, of the mappings, is selected based on a match between the identified conditions and a key from the particular mapping, and wherein each particular mapping maps (A) the key for the particular mapping to (B) action for the particular mapping;

wherein the mappings are:

a second mapping of (A) a second key for a particular vehicle condition of the vehicle being on the road, being below the specified speed, not being in traffic, and not being at a stop signal to (B) an action for emergency lights, comprising automatically enabling the emergency lights or providing a notification to a driver to enable the emergency lights;

a third mapping of (A) a third key for the vehicle being in a particular weather condition to (B) an action; and a fourth mapping of (A) a fourth key for a failure condition in specified components of the vehicle to (B) an action;

wherein the actions comprise:

automatically enabling, disabling, or controlling a vehicle system to affect vehicle movement, wherein the vehicle system comprises brakes, anti-lock braking systems, steering, windshield wipers, seat position configurations, mirror position configurations, automated driving modes, and the automated driving modes comprise sport mode, eco mode and poor weather mode;

wherein the vehicle sensor network comprises: component functionality sensors, pressure sensors, contact sensors, laser emitters, reflection detectors, weather sensors, speed sensors, acceleration sensors, steering wheel position, tire direction sensors, and transceivers for network connections.

2. The method of claim 1, wherein the identified conditions comprise identifications of one or more objects depicted in one or more images of the vehicle condition data from the vehicle sensor network.

3. The method of claim 1, wherein the vehicle condition data further comprises data, obtained from a network interface of the vehicle, comprising weather data or traffic data.

4. The method of claim 1, wherein the mappings comprise the first mapping;

wherein the vehicle comprises a lane deviation warning system (LDWS); and wherein causing the vehicle to take the one or more-actions is based on a combination of (a) the match between the identified conditions and the first key for the particular vibration pattern and (b) a lane deviation determination by the LDWS.

5. The method of claim 4, wherein the combination is performed in part by weighting (i) either or both of a value produced for the LDWS lane deviation determination and a value produced for the match between the identified conditions and the first key by (ii) either or both of a reliability factor and a confidence score.

6. The method of claim 1, wherein the vehicle condition data further comprises vibration readings, images or video, laser reflection readings, moisture readings, temperature, speed or acceleration data, indications of whether components are able to function, indications of a level at which components are functioning, angles of tires or of a steering wheel, status of other vehicle systems, data accessed through a network.

7. The method of claim 1, wherein the translating the vehicle condition data into identified conditions further comprises: comparing values from the vehicle condition data to threshold.

8. The method of claim 7, wherein a "raining" condition can be set when a moisture reading is above a corresponding threshold, a "nighttime" condition can be set when a brightness reading is below a corresponding threshold; and the process of translating by extracting values comprises recording a value from the vehicle condition data, the value comprises a current speed, an angle of a steering wheel position, or whether a vehicle component is functioning properly.

9. A non-transitory computer-readable storage medium storing instructions that, when executed by a computing system, cause the computing system to perform operations for automating vehicle actions, the operations comprising:

interfacing with a vehicle sensor network of a vehicle to obtain vehicle condition data;

translating the vehicle condition data into identified conditions, wherein the translating comprises:

identifying a vehicle condition using the vehicle sensor network, wherein the vehicle condition comprises: the vehicle being on the road, being below the specified speed, not being in traffic, and not being at a stop signal, wherein not being in traffic and not being at a stop signal are identified based on a determined location of the vehicle and traffic data obtained for the determined location from a network source external to the vehicle;

identifying weather conditions for an environment of the vehicle;

identifying a component functioning state for components of the vehicle; and extracting values from the vehicle condition data, performing various analyses on the vehicle condition data, and identifying conditions from network data or other external source data in the vehicle condition data;

causing the vehicle to take actions specified by mappings, wherein each particular mapping, of the mappings, is selected based on a match between the identified conditions and a key from the particular mapping, and wherein each particular mapping maps (A) the key for the particular mapping to (B) action for the particular mapping;

wherein the mappings are:

a second mapping of (A) a second key for a particular vehicle condition of the vehicle being on the road, being below the specified speed, not being in traffic, and not being at a stop signal to (B) an action for emergency lights, comprising automatically enabling the emergency lights or providing a notification to a driver to enable the emergency lights;

a third mapping of (A) a third key for the vehicle being in a particular weather condition to (B) an action; and a fourth mapping of (A) a fourth key for a failure condition in specified components of the vehicle to (B) an action;

wherein the actions comprise:

automatically enabling, disabling, or controlling a vehicle system to affect vehicle movement, wherein the vehicle system comprises brakes, anti-lock braking systems, steering, windshield wipers, seat position configurations, mirror position configurations, automated driving modes, and the automated driving modes comprise sport mode, eco mode and poor weather mode;

wherein the vehicle sensor network comprises: component functionality sensors, pressure sensors, contact sensors, laser emitters, reflection detectors, weather sensors, speed sensors, acceleration sensors, steering wheel position, tire direction sensors, and transceivers for network connections.

10. The non-transitory computer-readable storage medium of claim 9, wherein the mappings comprise the second mapping;

wherein the specified speed is zero.

11. The non-transitory computer-readable storage medium of claim 9, wherein at least one key for a particular one of the mappings is specified as an expression that connects multiple conditions by one or more operators;

wherein each condition specifies a value or value range; and wherein the at least one key is matched when the expression, when applied with the identified conditions, evaluates to true.

12. The non-transitory computer-readable storage medium of claim 9, wherein the key for at least one of the particular mappings defines a value or value range for a condition type which is matched when an identified value from the vehicle condition data for a corresponding condition type is equal to the value or falls within the value range.

13. A system for automating vehicle actions of a vehicle, the system comprising:

a vehicle sensor network that provides vehicle condition data;

one or more processors; and a memory storing instructions that, when executed by the one or more processors, cause the one or more processors to perform operations comprising:

translating the vehicle condition data into identified conditions, wherein the translating comprises:

identifying a vehicle condition using the vehicle sensor network, wherein the vehicle condition comprises: the vehicle being on the road, being below the specified speed, not being in traffic, and not being at a stop signal, wherein not being in traffic and not being at a stop signal are identified based on a determined location of the vehicle and traffic data obtained for the determined location from a network source external to the vehicle;

identifying weather conditions for an environment of the vehicle;

identifying a component functioning state for components of the vehicle; and extracting values from the vehicle condition data, performing various analyses on the vehicle condition data, and identifying conditions from network data or other external source data in the vehicle condition data;

causing the vehicle to take actions specified by mappings, wherein each particular mapping, of the mappings, is selected based on a match between the identified conditions and a key from the particular mapping, and wherein each particular mapping maps (A) the key for the particular mapping to (B) action for the particular mapping;

wherein the mappings are:

a second mapping of (A) a second key for a particular vehicle condition of the vehicle being on the road, being below the specified speed, not being in traffic, and not being at a stop signal to (B) an action for emergency lights, comprising automatically enabling the emergency lights or providing a notification to a driver to enable the emergency lights;

a third mapping of (A) a third key for the vehicle being in a particular weather condition to (B) an action; and a fourth mapping of (A) a fourth key for a failure condition in specified components of the vehicle to (B) an action;

wherein the actions comprise:

automatically enabling, disabling, or controlling a vehicle system to affect vehicle movement, wherein the vehicle system comprises brakes, anti-lock braking systems, steering, windshield wipers, seat position configurations, mirror position configurations, automated driving modes, and the automated driving modes comprise sport mode, eco mode and poor weather mode;

wherein the vehicle sensor network comprises: component functionality sensors, pressure sensors, contact sensors, laser emitters, reflection detectors, weather sensors, speed sensors, acceleration sensors, steering wheel position, tire direction sensors, and transceivers for network connections.

* * * * *